(No Model.)

J. S. COPELAND.
VEHICLE WHEEL.

No. 556,004. Patented Mar. 10, 1896.

Attest:
A. N. Jesbera
Chas. C. [illegible]

Inventor:
James S. Copeland
by Redding & Kiddle
Attys.

UNITED STATES PATENT OFFICE.

JAMES S. COPELAND, OF HARTFORD, CONNECTICUT, ASSIGNOR TO THE POPE MANUFACTURING COMPANY, OF SAME PLACE AND PORTLAND, MAINE.

VEHICLE-WHEEL.

SPECIFICATION forming part of Letters Patent No. 556,004, dated March 10, 1896.

Application filed January 2, 1896. Serial No. 573,994. (No model.)

*To all whom it may concern:*

Be it known that I, JAMES S. COPELAND, a citizen of the United States, residing in the city and county of Hartford, State of Connecticut, have invented certain new and useful Improvements in Wheels for Vehicles, of which the following is a specification, reference being had to the accompanying drawings, forming a part hereof.

The hubs of wheels for velocipedes and other vehicles in which lightness must be combined with strength are usually formed in one piece, either by drop-forgings or by working up a thick and heavy piece of tubing. The necessary result is that the completed hub has much superfluous metal where little is required to give the necessary strength, thereby adding to the dead-weight, and, furthermore, either process of manufacture involves much machining or handling of the hub and consequent expense.

The object which I have in view in the present invention is to make it possible to construct the hub of small and simple parts which can be easily and cheaply made in quantities, and can thereafter be assembled easily and secured firmly together by brazing or other suitable means, thereby reducing the expense of the construction to a minimum, while the parts are so related and combined as to dispense with all unnecessary weight, and at the same time to make a hub which shall be in all respects practically as strong as a hub made by drop-forging or otherwise and much lighter.

I will particularly describe and explain hereinafter the features of construction wherein the invention consists, reference being had to the accompanying drawings, in which—

Figure 1:
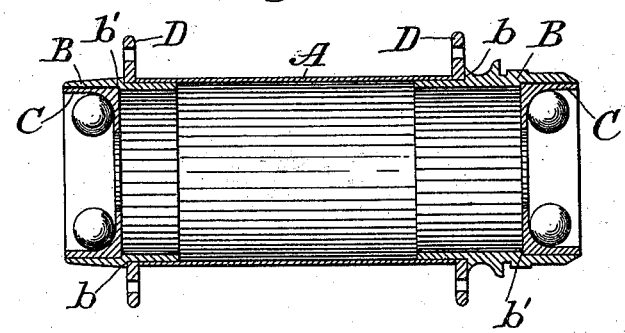
Figure 2:
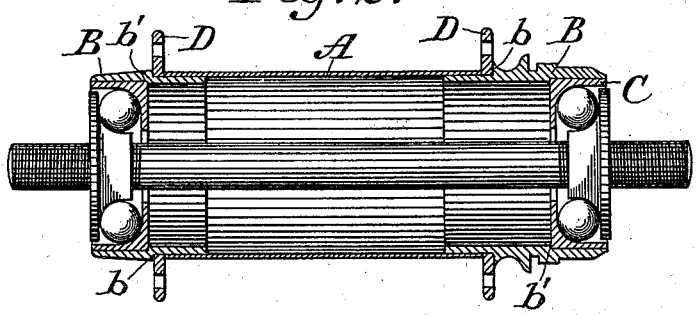

Figure 1 is a longitudinal central section of a hub which is constructed in accordance with the invention. Fig. 2 is a similar view, but showing the wheel shaft or axle in relation to the hub.

The central portion of the hub consists of a cylindrical barrel A, which may be made of light tubing, as it is subjected in use to no severe strains. In each end of the barrel A is secured a sleeve or end tube B, which is formed with an external shoulder $b$ to limit the inward movement of the sleeve or end tube, and with an internal shoulder $b'$, which forms a stop and seat for the ball-bearing case C. One of the sleeves B, as represented at the right in Fig. 2, may also be formed to receive a sprocket-wheel, if desirable. The flanges D D, to which the usual wire spokes are secured, are simply rings or washers which are driven onto the inner ends of the sleeves or end tubes B B before the latter are forced into the respective ends of the barrel A.

It will be obvious that the parts may be secured together by any suitable means. Thus they may be formed to have a tight fit the one with the other and be driven together, or they may have a looser fit and be brazed together after assembling.

It will be evident that each of the parts above mentioned can be made with the minimum amount of material consistent with the strains to which it is subjected in use, and that when the parts are assembled and secured together the whole structure will be no less strong than if drop-forged or otherwise made in one piece, while the cost of production of the completed hubs will be very much less than would be the case if they were made by drop-forging or otherwise formed in one piece.

What I claim, and desire to secure by Letters Patent, is—

1. A hub for a vehicle-wheel composed of a central, cylindrical barrel, sleeves or end tubes inserted respectively in the ends of said barrel, and washers placed upon said sleeves or end tubes against the respective ends of said barrel, all of said parts being secured together, substantially as shown and described.

2. A hub for a vehicle-wheel composed of a central, cylindrical barrel, end tubes or sleeves fitted respectively within the ends of said barrel and having each an external shoulder to limit the inward movement of the sleeve with respect to the barrel, and rings or washers placed on the inner ends of said sleeves or end tubes between the ends of the central barrel and the external shoulders of the respective end tubes or sleeves, all of said parts being firmly secured together, substantially as shown and described.

3. A hub for a vehicle-wheel composed of a central, cylindrical barrel, end tubes or sleeves inserted in the respective ends of said barrel and having each an external shoulder to limit the inward movement of the end tube or sleeve with respect to the barrel and an internal shoulder, washers placed upon the inner ends of the respective end tubes or sleeves between the ends of the barrel and the external shoulders of the end tubes or sleeves, and ball-bearing cases inserted in the outer ends of said sleeves and seated against the internal shoulders thereof, all of said parts being firmly secured together, substantially as shown and described.

This specification signed and witnessed this 28th day of December, A. D. 1895.

JAMES S. COPELAND.

In presence of—
   FELTON PARKER,
   CHARLES DE LOS RICE.